United States Patent [19]
Guisinger et al.

[11] Patent Number: 5,325,246
[45] Date of Patent: Jun. 28, 1994

[54] AUTOMATIC TRACKING METHOD FOR HELICAL SCAN MAGNETIC TAPE RECORDER USING REPRODUCED TIMING SIGNAL TO SAMPLE TWO OUT-OF-PHASE REFERENCE SIGNALS

[75] Inventors: Barrett E. Guisinger, Saratoga; Harold V. Clark, Los Altos, both of Calif.

[73] Assignee: Datatape Incorporated, Pasadena, Calif.

[21] Appl. No.: 892,074

[22] Filed: Jun. 1, 1992

[51] Int. Cl.$^5$ .................... G11B 5/584; G11B 15/467; G11B 15/52
[52] U.S. Cl. .............................. 360/77.13; 360/73.09; 360/73.12
[58] Field of Search .............. 360/77.12, 77.13, 77.14, 360/77.15, 73.09, 73.12; 358/323

[56] References Cited

U.S. PATENT DOCUMENTS

| | | | |
|---|---|---|---|
| 4,347,534 | 8/1982 | Kimura | 360/77.12 |
| 4,393,416 | 7/1983 | Takeuchi et al. | 360/10.2 |
| 4,755,893 | 7/1988 | Yamada et al. | 360/77 |
| 4,802,032 | 1/1989 | Tatsuzawa et al. | 360/77.13 |
| 4,868,692 | 9/1989 | Nakase et al. | 360/77.16 |
| 4,890,173 | 12/1989 | Yokozawa | 360/77.15 |
| 4,920,435 | 4/1990 | Yamazaki | 360/77.15 |
| 4,942,487 | 7/1990 | Noguchi | 360/77.13 |
| 4,943,873 | 7/1990 | Kawasaki | 360/77.15 |
| 4,954,902 | 9/1990 | Furuhata et al. | 360/10.2 |
| 4,991,035 | 2/1991 | Taki | 360/70 |
| 5,008,764 | 4/1991 | Yoshida et al. | 360/77.15 |
| 5,012,358 | 4/1991 | Kohsaka | 360/70 |
| 5,067,033 | 11/1991 | Wakui | 360/70 |

OTHER PUBLICATIONS

Harry Kybett, "Video Tape Recorders," 2nd Edition, 1978, pp. 148-156.

*Primary Examiner*—Aristotelis Psitos
*Assistant Examiner*—James L. Habermehl
*Attorney, Agent, or Firm*—William F. Noval

[57] ABSTRACT

In a helical scan recorder in which timing signals are recorded on adjacent slant tracks on magnetic tape, an automatic tracking technique for maintaining correct reproduce head to track positioning. The automatic tracking technique includes reproducing recorded timing signals from adjacent slant tracks on magnetic tape, producing first and second simultaneous repetitive reference signals which are coherent with the reproduced timing signals and which are 180° out of phase with each other, simultaneously sampling each of the reference signals with the reproduced timing signals, selecting from the sampled reference signal the signals which are sampled in the mid-range of values thereof, and comparing the selected sampled reference signals and producing a tracking error signal if there is a difference therein.

6 Claims, 5 Drawing Sheets

AUTOMATIC TRACKING METHOD FOR HELICAL SCAN MAGNETIC TAPE RECORDER USING REPRODUCED TIMING SIGNAL TO SAMPLE TWO OUT-OF-PHASE REFERENCE SIGNALS

FIELD OF THE INVENTION

This invention relates in general to magnetic tape recording and reproducing apparatus and, more particularly, to a technique for automatic tracking in a helical scan magnetic tape recorder.

DESCRIPTION OF THE PRIOR ART

Magnetic tape recorders are widely used for the recording and reproducing of large amounts of information, such as video or audio information and digital data. In a typical helical scan magnetic tape recorder, magnetic tape is transported between reels along a tape path which includes a helical path around a rotary head scanner. The rotary head scanner typically includes two (or more) heads on opposite sides of a head wheel. The magnetic heads have gaps which are tilted at opposite azimuth angles. As the magnetic tape traverses a helical path relative to a rotating magnetic head, the head crosses the width of the tape at a shallow angle to record adjacent slanted tracks on the tape. When the information recorded in the tracks is reproduced, it is necessary that the magnetic heads exactly scan the recorded tracks in order to minimize signal degradation and maintain high signal-to-noise ratio.

Several tracking techniques have been proposed to effect accurate tracking of magnetic heads during reproduction. One technique uses a separate longitudinal control track along the bottom of the tape upon which is recorded a timing reference signal. The reference signal is reproduced by a stationary magnetic head and is locked to a position signal of the rotating magnetic head(s). A capstan servo system is controlled to correctly position the reproduce head relative to the recorded data track on tape. The control track type of auto tracking system is disadvantageous due to the reduced width of tape available for recording information, and due to the complexity of recorder design requiring extra magnetic heads and associated circuitry.

An alternative automatic tracking scheme used in 8 mm video cassette recorders utilizes four different frequency pilot tones recorded in successive tracks on tape. Although this method eliminates the control track and associated stationary heads and circuitry from the tape recorder, any savings gained is offset by the complex circuitry required to detect and process the four different low frequency pilot tones. Another automatic tracking scheme used in digital audio tape recorders (so called RDAT recorders) is known as area divided automatic tracking. In this tracking scheme, the tape is subdivided into several unique sections using four data tracks to form an ATF pattern. Each track has digitally encoded data recorded between start and end ATF areas. Upon reproduction, the reproduce head is 1.5 times the width of the recorded track. Thus, a reproduce signal includes a signal from the recorded track as well as crosstalk components from adjacent tracks on either side of the track being reproduced. This automatic tracking technique is disadvantageous because of the complexity of the tracking circuitry, the inconvenience and expense of using an oversized reproduce head, and the reduction of track length available for recording data because of the recorded ATF areas. This technique is disclosed in the following patents U.S. Pat. No. 4,991,035, issued Feb. 5, 1991 inventor Taki; U.S. Pat. No. 4,651,239, issued Mar. 17, 1987, inventors Omori et al.; U.S. Pat. No. 4,755,893, issued Jul. 5, 1988, inventors Yamada et al.; U.S. Pat. No. 4,943,873, issued Jul. 24, 1990, inventor Kawasaki; U.S. Pat. No. 5,008,764, issued Apr. 16, 1991, inventors Yoshida et al.; U.S. Pat. No. 4,890,173, issued Dec. 26, 1989, inventor Yokozawa; U.S. Pat. No. 4,920,435, issued Apr. 24, 1990, inventor Yamazaki; and U.S. Pat. No. 4,942,487, issued Jul. 17, 1990, inventors Noguchi et al.

Another autotracking technique is disclosed in U.S. Pat. No. 4,868,692, issued Sep. 19, 1989, inventors Nakase et al. As disclosed therein, a tracking error signal forming circuit is disclosed which includes, adjacent reproduce magnetic heads which reproduce H sync signals from adjacent recorded tracks, a circuit for determining a time difference signal between the reproduced H sync signals, an operating circuit for calculating the difference between the time difference signal and a reference value to produce a tracking error signal, and an envelope detector for determining the maximum value of at least one of the reproduced signals. The tracking error signal is determined at the time of the maximum value of the reproduced signal. The technique disclosed in this patent is disadvantageous because of the complexity of the autotracking circuit including the inclusion of a reproduced signal envelope detector.

SUMMARY OF THE INVENTION

According to the present invention, there is provided a new and improved autotracking technique for use in helical scan magnetic tape recorders which is an improvement over known autotracking techniques. The autotracking technique of the present invention is simple, efficient, and cost effective. Autotracking is achieved without the necessity of envelope detection. Moreover, a synchronized reference signal is not required, and problems relating to drift, phase lock loop control, and temperature errors are solved.

According to an aspect of the present invention, an autotracking apparatus is provided for a helical scan magnetic tape recorder for reproducing a high stability timing signal recorded on adjacent slant tracks on magnetic tape and for using the reproduced timing signals to sample two simultaneous reference signals which are coherent with the timing signal and out of phase with respect to each other. According to one aspect of the present invention, the simultaneous reference signals are two linear ramp (sawtooth) signals which are 180 degrees out of phase with each other. According to another feature of the present invention, the simultaneous reference signals are two digital counters wherein the counter reset times are set such that a given counter will reset at the time the other counter reaches $\frac{1}{2}$ maximum count.

According to the invention, means are provided for choosing consecutive samples from that reference signal of the two reference signals in which the samples are taken from the mid-region of the reference signal. Means are provided for comparing the chosen samples and for producing an error signal for correcting tracking errors.

DESCRIPTION OF THE PREFERRED EMBODIMENTS

On a dual channel, or two sequential channels, rotary head record/reproduce system utilizing azimuth recording techniques such as is commonly done with VHS and other helical scan recorders, tracking error information can be derived from a comparison of the relative time of occurrence of appropriate signals reproduced from adjacent tracks recorded with opposite azimuth angles. This will become evident from a study of FIG. 1 and the following descriptions.

Figure 1:
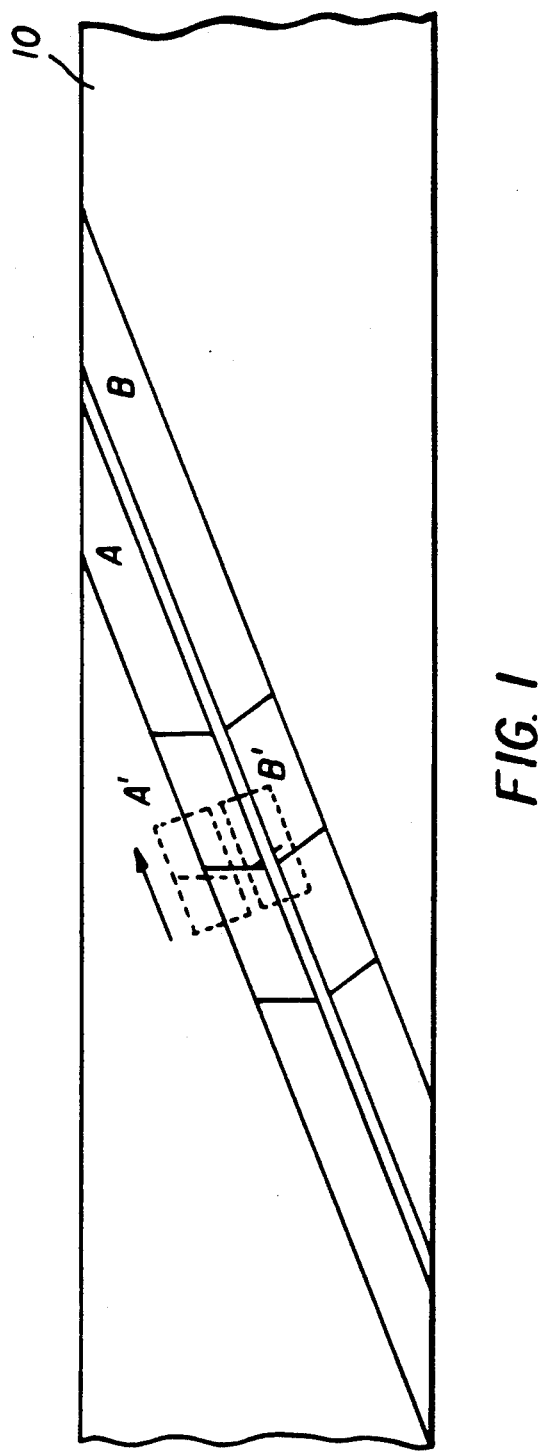
FIG. 1 is a diagrammatic representation useful in explaining the present invention.

FIG. 1 depicts two adjacent, opposite azimuth recorded tracks, A and B, on magnetic tape 10 such as would occur on a typical rotary head azimuth recording, and two play back heads A' and B' with a tracking offset. It is apparent that the gap of head A' is still approaching the recorded line on channel A while the gap of head B' is already passed the corresponding line on channel B. This represents a time delay of signals from channel A with respect to a stable reference, and a time advance of signals from channel B with respect to the same reference, when mistracking occurs in the direction depicted. Mistracking in the other direction would produce the opposite timing shifts.

In FIG. 1, the heads A', B' are shown as though they were two parallel channels, physically side by side, recording or playing simultaneously. This indeed is one possible configuration, but a single track sequential system having two heads 180° apart on a rotary drum, such as a typical VHS format, is also feasible if the rotary drum is tightly phase lock servoed to the stable reference. Any time jitter of the drum phase between sequential track measurements will be additive noise to the error signal of the tracking detector circuits, but generally can be integrated out.

Another possible configuration is one such as the M-II format in which two channels are recorded and played simultaneously. In such format, the actual heads are positioned in tandem with a height offset rather than side by side so there is a small angular spacing between them on the rotary drum. This makes possible simultaneous timing measurements from the two channels, eliminating any time jitter of the drum or transport system between measurements.

In general, according to the invention automatic tracking method and apparatus are provided to measure the timing shift due to mistracking. The method involves a high stability recorded timing signal such as a pilot tone, sync pulse, or other highly stable periodic signal recorded alternately on channels A and B. On playback, the reproduced timing signal is compared in time with a high stability reference signal with which the reproduced signal is coherent. The relationship of the signals could be as depicted in FIG. 2.

Figure 2:
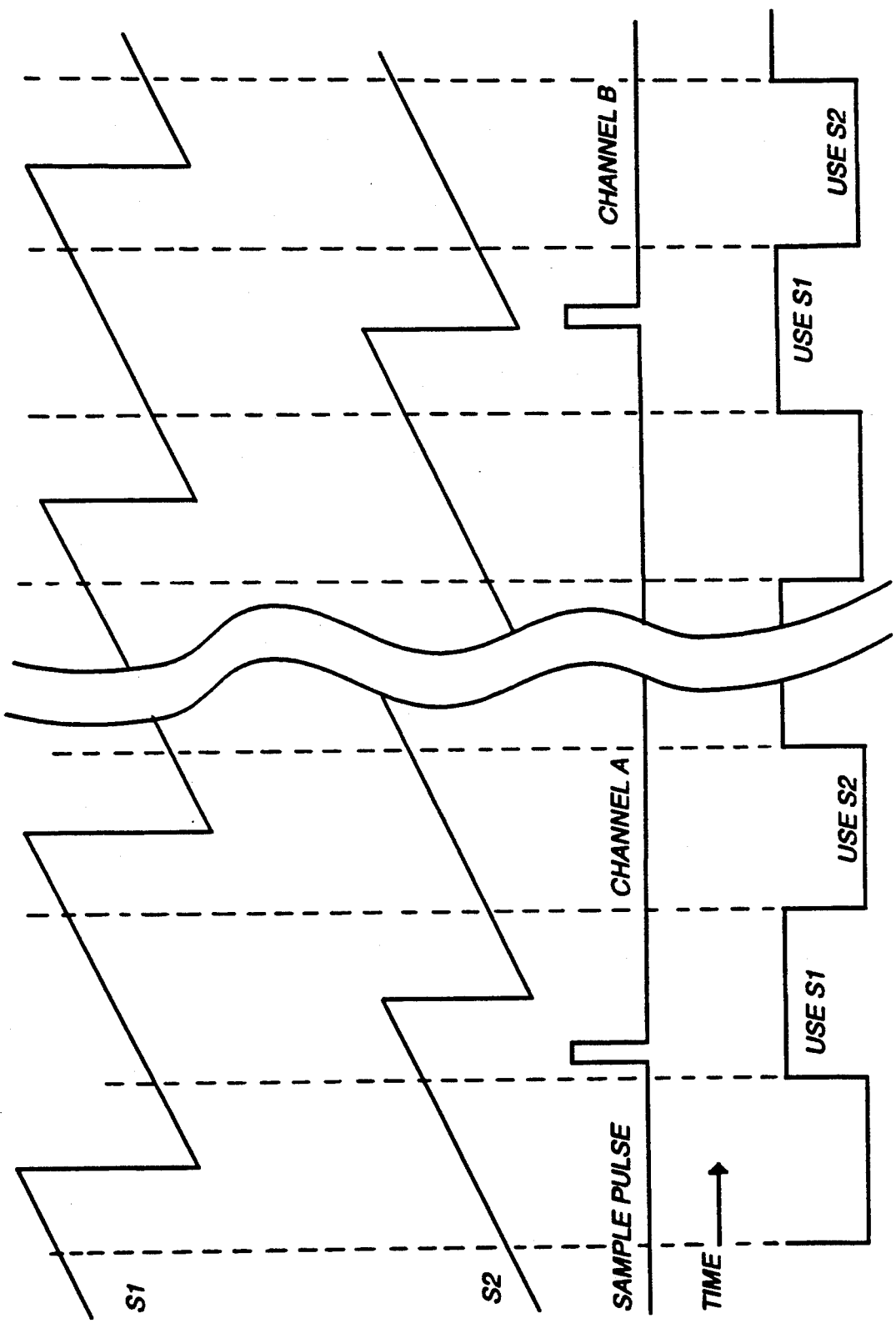
FIG. 2 is a waveform diagram useful in understanding the operation of the embodiment of FIG. 3.
Figure 3:
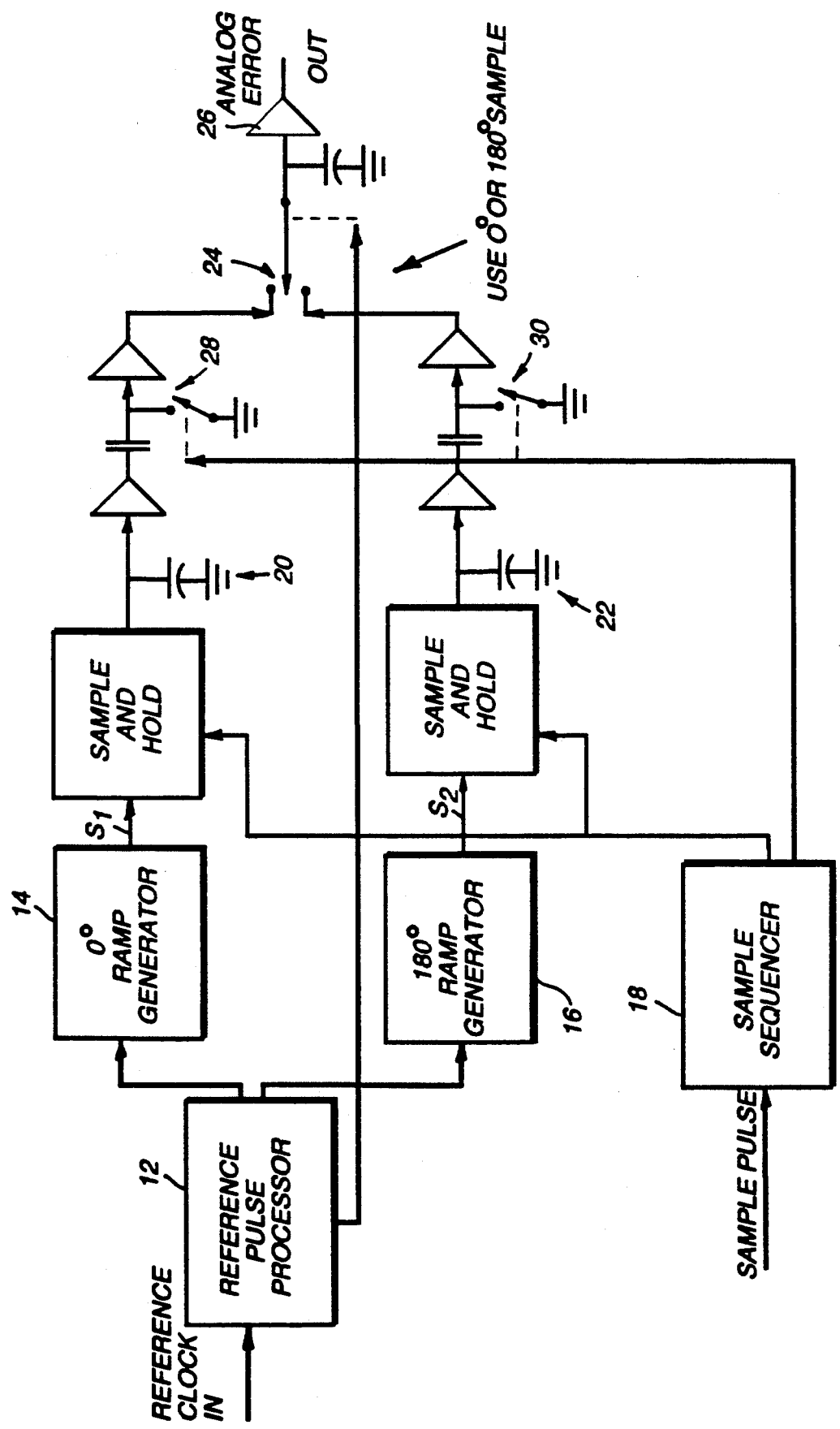
FIG. 3 is a block diagram of an embodiment of the present invention.

Referring to FIGS. 2 and 3, there will be described an analog embodiment of the present invention.

In FIG. 2, two linear ramp sawtooth signals, $S_1$ and $S_2$, are generated as high stability reference signals. The two sawtooth signals are 180° out of phase so that the reset point of one ramp occurs at the middle of the other signal's ramp. Sampling pulses derived from a reproduced signal coherent with the ramp signals, are continually sampling both ramps. The sampling pulses are derived alternately from channel A and B. It is evident that the sample from one of the two phases will always be in the mid-region of a ramp, ±90°. The measurements from the ramp mid-region will be used, and the other measurements discarded. The measurement needed is merely the difference in value of successive samples. By this method, the effect is as though an endless ramp is being sampled. There are no discontinuities—you never run off the end of the ramp or over the reset point. If there is no mistracking, the difference in values between A and B samples will be nominally zero. If there is mistracking, the apparent shift in relative timing between channels A and B will result in a non-zero difference between A and B samples. The sign of the difference is determined by the direction of mistracking, and the magnitude is proportional to the degree of mistracking up to the point where adjacent track interference garbles the sampling signal. The only requirement on the relationship of ramp period to relative timing error is that the total time error difference, including all sources such as drum servo jitter, mistracking, and tape flutter, from one sample to the next must never exceed 90° of the ramp period. This assures that the measurements are always from the same corresponding ramp sections—the effect of jumping a ramp reset has not occurred. When measurements reach the point 90° from either ramp end, the next pair of measurements is taken from the other ramp which is then operating toward the middle. In the example shown in FIG. 2, the samples taken from the $S_1$ signals are used, and the $S_2$ samples are discarded.

A block diagram of an analog embodiment is shown in FIG. 3. As shown, a reference clock is input to reference pulse processor 12 which drives ramp generators 14 and 16 to produce 180° out of phase simultaneous reference signals $S_1$ and $S_2$. Sample pulses reproduced from recorded channels A and B are supplied to sample sequencer 18 which causes sample and hold circuits 20 and 22 to sample signals $S_1$ and $S_2$, respectively. Reference pulse processor 12 produces a signal applied to switch 24 to use either the $S_1$ sample or the $S_2$ sample. Comparator 26 compares consecutive samples from channels A and B to determine any error signal. Such error signal is used to correct mistracking by controlling a tape capstan or a reproduce head positioner. Sample sequencer 18 also produces a reset signal applied to reset circuits 28 and 30.

Figure 4:
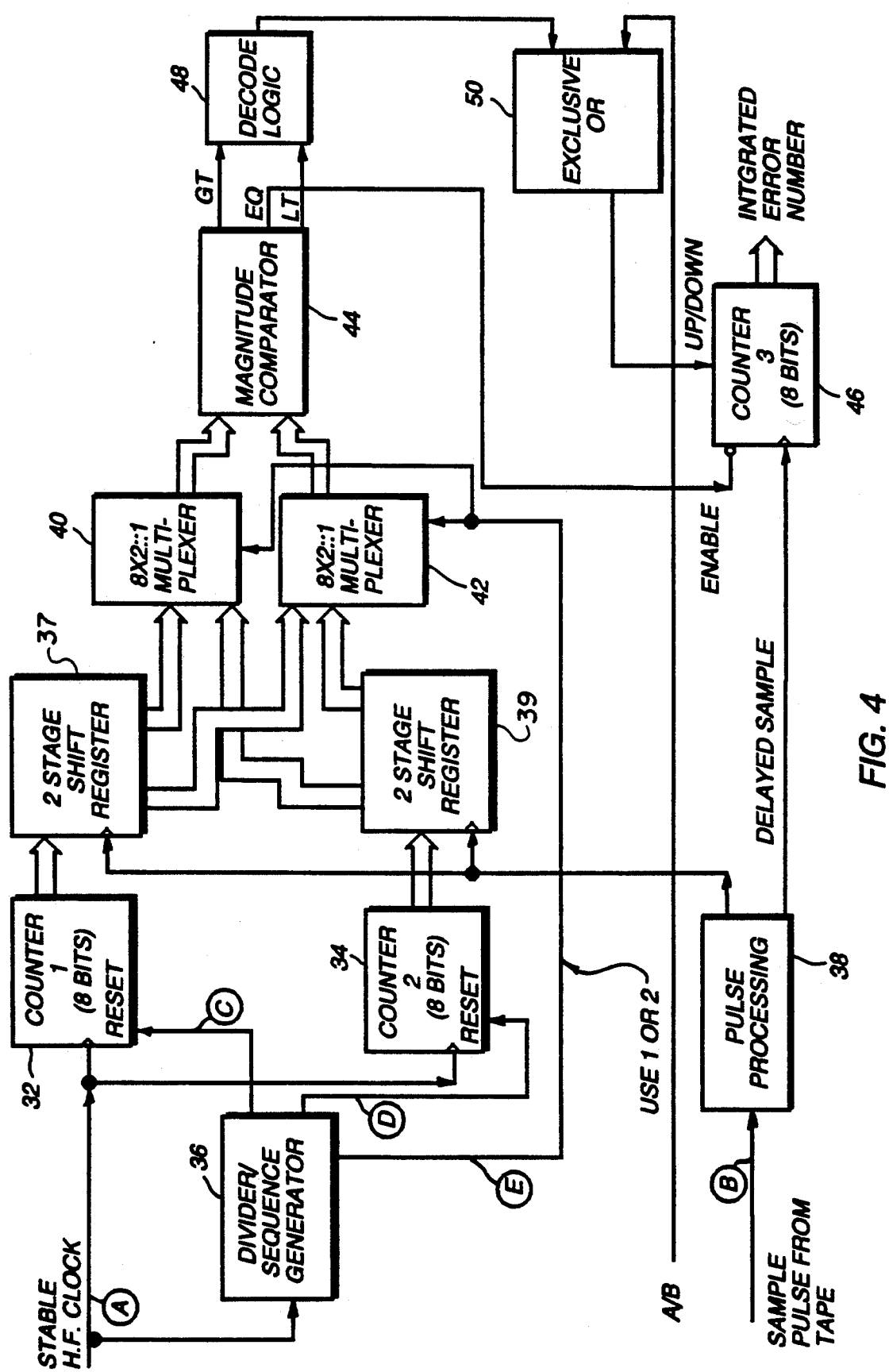
FIG. 4 is a block diagram of another embodiment of the present invention.
Figure 5:
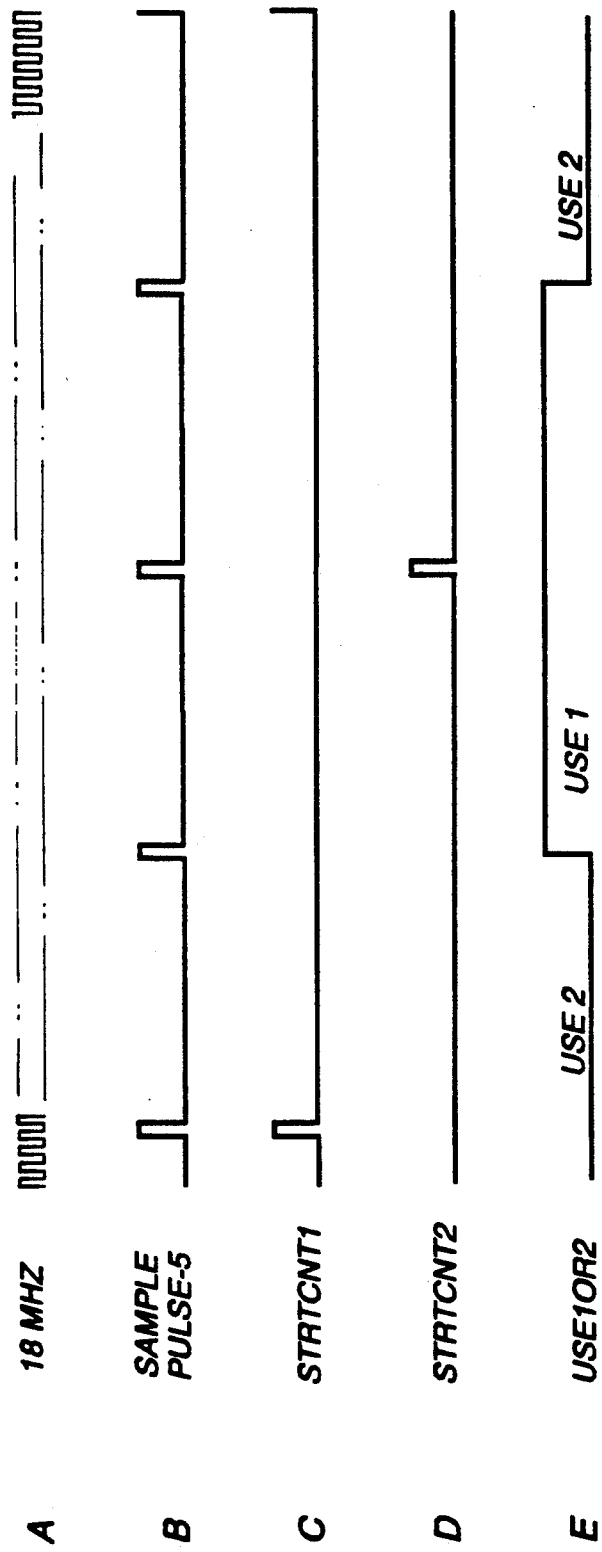
FIG. 5 is a waveform diagram useful in understanding the operation of the embodiment of FIG. 4.

An analogous circuit and procedure can be developed with all digital techniques. FIG. 4 is a block diagram of a digital embodiment of the present invention. Two counters, 32 and 34, count a high frequency clock (FIG. 5, waveform A) with a period at least as small as the timing error corresponding to the smallest mistracking to be detected. The counters 32 and 34 can be alternately reset by reset signals (FIG. 5, waveforms C, D) at times corresponding to the ramp reset times. Divider/Sequence Generator 36 produces the reset signals C, D. The reset rate may be any convenient integer division of the high clock rate, preferably in the range of 1/16 to 1/64. In this range, reasonable bit length counters can be used while still maintaining the requirement that a maximum channel A to channel B relative timing shift not exceed ½ of a counter maximum count range.

The counter 32, 34 reset times are set such that a given counter will reset at the time the other counter reaches ½ maximum count. Sample pulses from tape are received by pulse processing circuit 38 which causes both counters 32, 34 to be read and the values of each stored in the first stages of 2-stage shift registers 37, 39 associated with each counter 32, 34, respectively. When the next sample pulse, from the opposite channel occurs, the first readings are shifted to the second stages of the shift registers and the new readings are stored in the first stages. When a pair of successive readings is thus obtained, a decision is made by generator 36 to use either counter 32 or counter 34 readings, which ever are from the mid-range of their corresponding counters. The values of the chosen pair are then compared after passing through one of multiplexers 40 or 42 by a magnitude comparator 44 to show one to be less than, greater than, or equal to the value of the other. Depending on the result of the comparison and through decode logic circuit 48 and exclusive OR gate 50, a third counter 46, an up-down counter, is incremented one count, decremented one count, or unchanged. The output number of this third counter 46 is the integrated mistracking error and can be used either digitally or converted to an analog value to correct the tracking error by means of a capstan servo or a magnetic head positioner.

What is claimed is:

1. In a helical scan recorder in which timing signals are recorded on adjacent slant tracks on magnetic tape, automatic tracking apparatus comprising:
    means for reproducing recorded timing signals from adjacent slant tracks on magnetic tape;
    means for producing first and second simultaneous, repetitive reference signals which linearly change in amplitude from a lowest value, through a mid range of values to a highest value, which are coherent with said reproduced timing signals, which are 180° out of phase with each other, but which are not synchronized with said reproduced timing signals;
    means for simultaneously sampling each of said reference signals with said reproduced timing signals;
    means for selecting from said sampled reference signals the signals which are sampled in the mid-range of values thereof; and
    means for comparing said selected sampled reference signals and for producing a tracking error signal if there is a difference therein.

2. The apparatus of claim 1 wherein said means for reproducing simultaneously reproduces timing signals from adjacent tracks on said tape.

3. The apparatus of claim 1 wherein said means for reproducing sequentially reproduces timing signals from adjacent tracks on said tape.

4. The apparatus of claim 1 wherein said means for producing includes ramp generator means for generating first and second simultaneous ramp signals which are 180° out of phase with each other.

5. The apparatus of claim 1 wherein said means for producing includes clock means for producing a high frequency clock signals and first and second counter means having predetermined maximum counts for respectively counting pulses of said high frequency clock signal, and wherein said counter means are reset such that one of said counter means is reset at the time said other counter means reaches one-half maximum count.

6. In a helical scan recorder in which timing signals are recorded on adjacent slant tracks on magnetic tape, automatic tracking apparatus comprising:
    means for reproducing recorded timing signals from first and second adjacent slant tracks on magnetic tape;
    first and second counters for simultaneously counting pulses of a high frequency pulse train, each of said first and second counters having the same preselected maximum count;
    control means for alternatively resetting one said first and second counters when the other of said first and second counters has reached one-half the maximum count;
    first and second shift registers connected respectively to said first and second counters, wherein each of said first and second shift registers have first and second stages;
    timing signal processing means (a) for processing said reproduced timing signal from said first track to simultaneously read out said first and second counters and to store said read out values respectively in said first stages of said first and second shift registers, and (b) for thereafter processing said reproduced timing signal from said second track to simultaneously read out said first and second counters and to store said readout values in said first stages of said first and second shift registers, after said first read out values have been shifted to said second stages of said first and second shift registers;
    a comparator;
    multiplexer means connected between said first and second shift registers and said comparator;
    wherein said control means includes means for selecting whether to use the counts stored in said first shift register or said second shift register on the basis of whether the values are mid range between the beginning and maximum counts and for transferring the pair of counts from said selected shift register to said comparator by means of said multiplex means, wherein said comparator produces a tracking error signal if the said two compared counts are different.

* * * * *